United States Patent [19]

Handtmann et al.

[11] Patent Number: 4,867,638
[45] Date of Patent: Sep. 19, 1989

[54] SPLIT RING SEAL OF A CENTRIFUGAL PUMP

[75] Inventors: Albert A. Handtmann, Biberach; Günter Haupt, Stadtbergen; Erwin Gebhard, Tagmersheim; Franz Fischer, Königsbrunn; Valentin Schröder, Augsburg, all of Fed. Rep. of Germany

[73] Assignee: Albert Handtmann Elteka GmbH & Co KG, Fed. Rep. of Germany

[21] Appl. No.: 165,726

[22] Filed: Mar. 9, 1988

[30] Foreign Application Priority Data

Mar. 19, 1987 [DE] Fed. Rep. of Germany ....... 3708956

[51] Int. Cl.$^4$ .................... F04D 29/08; F04D 29/02
[52] U.S. Cl. .......................... 415/172.1; 415/217.1
[58] Field of Search .............. 415/170 A, 170 R, 174, 415/212 R, 212 A, 200; 416/241 A

[56] References Cited

U.S. PATENT DOCUMENTS

| | | | |
|---|---|---|---|
| 3,381,620 | 5/1966 | Cushing et al. | 415/174 |
| 3,779,667 | 12/1973 | Johnson | 415/170 A |
| 3,826,509 | 7/1974 | Frank et al. | 415/170 A |
| 3,958,894 | 5/1976 | Rowley et al. | 415/170 A X |
| 4,023,918 | 5/1977 | Stahl | 415/170 A X |
| 4,207,024 | 6/1980 | Bill et al. | 415/174 |
| 4,269,903 | 5/1981 | Clingman et al. | 415/174 X |

OTHER PUBLICATIONS

"Werkstofftechnik", vol. 17, Oct. 1986, pp. 378–384.
"CAV-8-86", Aug. 1987, pp. 87–90.

Primary Examiner—Robert E. Garrett
Assistant Examiner—Joseph M. Pitko
Attorney, Agent, or Firm—Ratner & Prestia

[57] ABSTRACT

A split ring seal of a centrifugal pump comprises two rings that consist of a sintered material and that are respectively connected in a frictional or positive manner to a front cover disk of the impeller and to the pump housing which are made of a cast polyamide as produced by the activated anionic polymerization of monomeric laurinlactam.

4 Claims, 3 Drawing Sheets

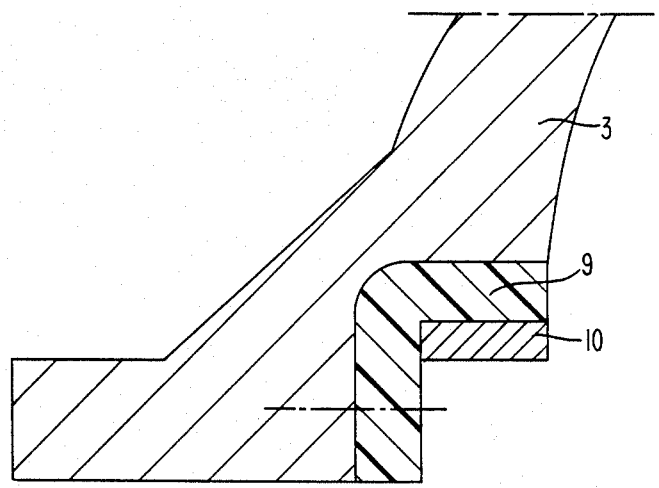
FIG.IA

SPLIT RING SEAL OF A CENTRIFUGAL PUMP

FIELD OF THE INVENTION

This invention relates to a split ring seal of a centrifugal pump.

BACKGROUND ART

In the past few years it has become more and more clear in the field of centrifugal pumps, which covers a relatively wide range of application in industry, that for the achievement of application-oriented maximum service lives the essential wearing parts of the pump must be made from materials which guarantee the correspondingly optimimum material properties with regard to the delivery medium concerned. Apart from the consideration of the flow rates of the delivery media through the pump, which are usually very high, other criteria mainly regarding the causes of damage leading to the destruction of the materials are of importance to this correspondingly individual selection of materials which must be adapted to the most different delivery media. These criteria can be substantially subsumed under the influences to be taken into account here, namely corrosion, erosion, cavitation and/or a combination thereof, the classification depending on the predetermination of specific parameters of the delivery media, especially the pH-value, the solids content, the temperature and the flow rate of the media.

When being employed, for instance in connection with highly aggressive delivery media, the materials which have mostly been used for heavily loaded centrifugal pumps when the aforementioned criteria are to be complied with are a martensitic chromium-molybdenum alloyed cast iron with the DIN designation C-X 250 CrMg 15 3. With regard to this material it is stated in the journal "cav 8/86", pages 87 to 90 that as far as hardness and wear resistance are concerned it is only surpassed by pure metal oxides/carbides or also by hard surfacings, but that in comparison therewith it has the advantage of being machinable in the soft-annealed state. Apart from the customary casting materials GG-25, GGG-40.3, etc. which are also in current use, other corrosion-resistant special materials which are also suited for delivery media with a high content of solids are -according to this literature - an austenitic ferritic steel with the DIN designation C-X 3 CrNiMoCu 24 6 and a chill casting which is also chromium-molybdenum alloyed and has the DIN designation G-X 170 CrMo 25 2. Since all of these special materials are relatively expensive, their use has substantially been restricted to the impeller and apart from that - but only in practice - to component parts which, like the two rings of the split ring seal which is disposed on the front cover disk of the impeller in every centrifugal pump, turn out to be replacement parts which are especially susceptible to wear. Furthermore, the journal "Wekstofftechnik", Vol. 17, October 1986, pages 378 to 384, shows the results of tests in which a comparison is made between the aforementioned austenitic ferritic steel with the DIN designation G-X 3 CrNiMoCu 24 6 and a cast polyamide made by the activated anionic polymerization of monomeric laurinlactam and in which the destruction of the materials by cavitational loading is examined. In the preliminary period of the present invention this cast polyamide already proved to be a highly resistant alternative material to a high-quality nickel chromium steel when it was used for a wear disk in centrifugal pumps intended for delivering very abrasive media occurring in sugar industry.

This invention which is characterized by the patent claims solves the problem of providing a split ring seal of the stated type which is also very susceptible to wear in centrifugal pumps and in the case of which the knowledge gained in the construction of pumps is broadened with regard to a possible use of the aforementioned cast polyamide as an alternative material for other critical pump parts of this type.

SUMMARY OF THE INVENTION

The split ring seal of this invention has the advantages that due to the characterized composite arrangement of the cast polyamide with a sintered material the mainly hard, wear and temperature resistant material properties thereof are now made use of in an optimum way, as the impact strength which, on the other hand, is only minimum because of the great hardness is optimally compensated by the cast polyamide. This compensation which is consequently accomplished with regard to a more or less great risk of breakage is here simultaneously favored by the possibility that due to a cast polyamide melt which shows a relatively high fluidity under casting conditions the composite arrangement of said polyamide with the two rings can virtually be made without any closer consideration of the constructional details applying to the entire split ring seal. Of course, the manufacturer can here also modify the melt of the cast polyamide prior to its integral casting with the rings by using the customary reinforcing agents, such as glass fibers or glass spheres, fillers, such as kiesalouhr or metal powder, lubricants, such as graphite or molybdenum sulfate, or other additives added prior to polymerization. Finally, due to this composite arrangement with the cast polyamide, each of the two rings seems to be less critical with regard to the tolerances which are relevant to the production thereof because it is virtually only the gap size which must now be observed when they are arranged with respect to each other with the usual size of about 0.1 mm being practically uncritical.

BRIEF DESCRIPTION OF THE DRAWINGS

FIG. 1a shows an expanded version of a part of the split ring seal.

Figure 1:
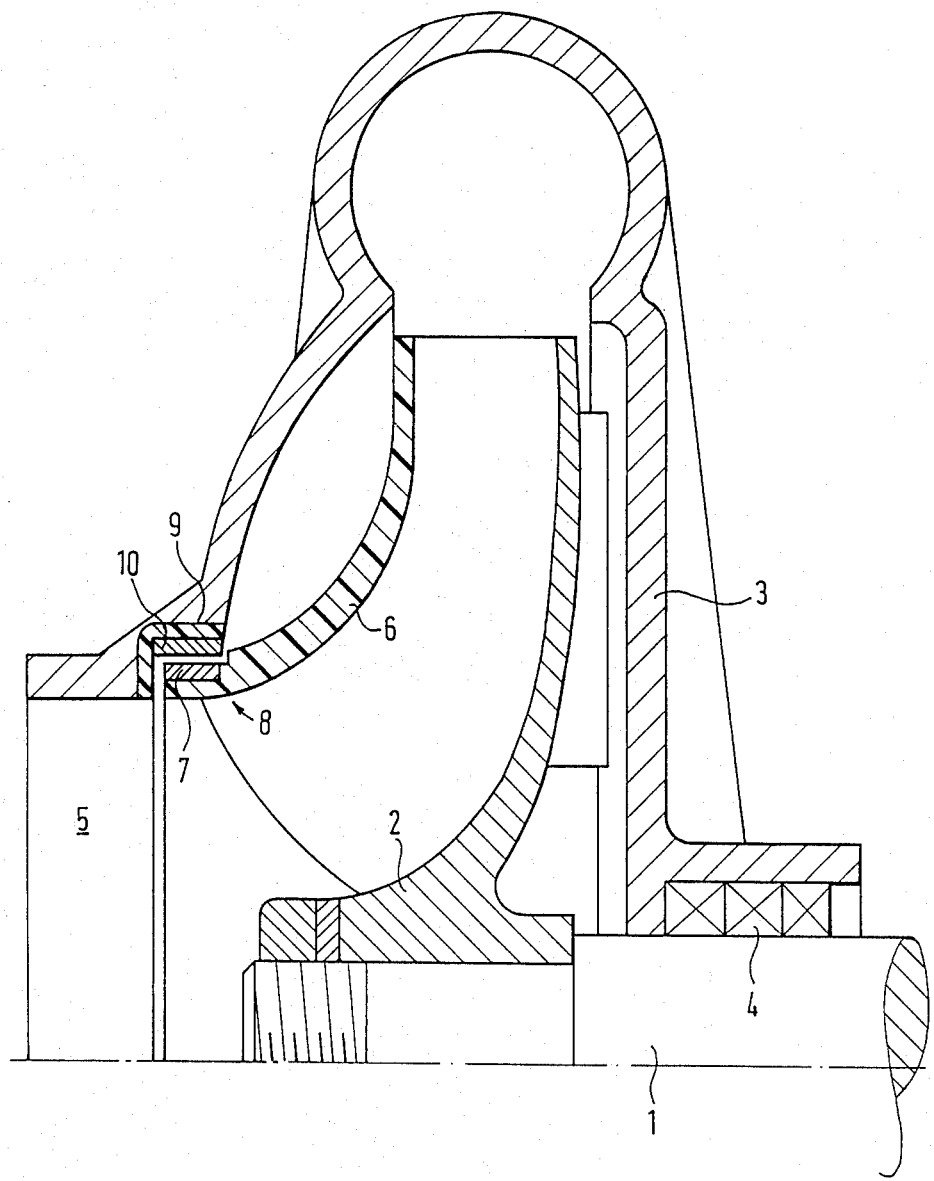
FIG. 1 shows an embodiment of the split ring seal of the invention with a meridian section of a centrifugal pump.
Figure 2:
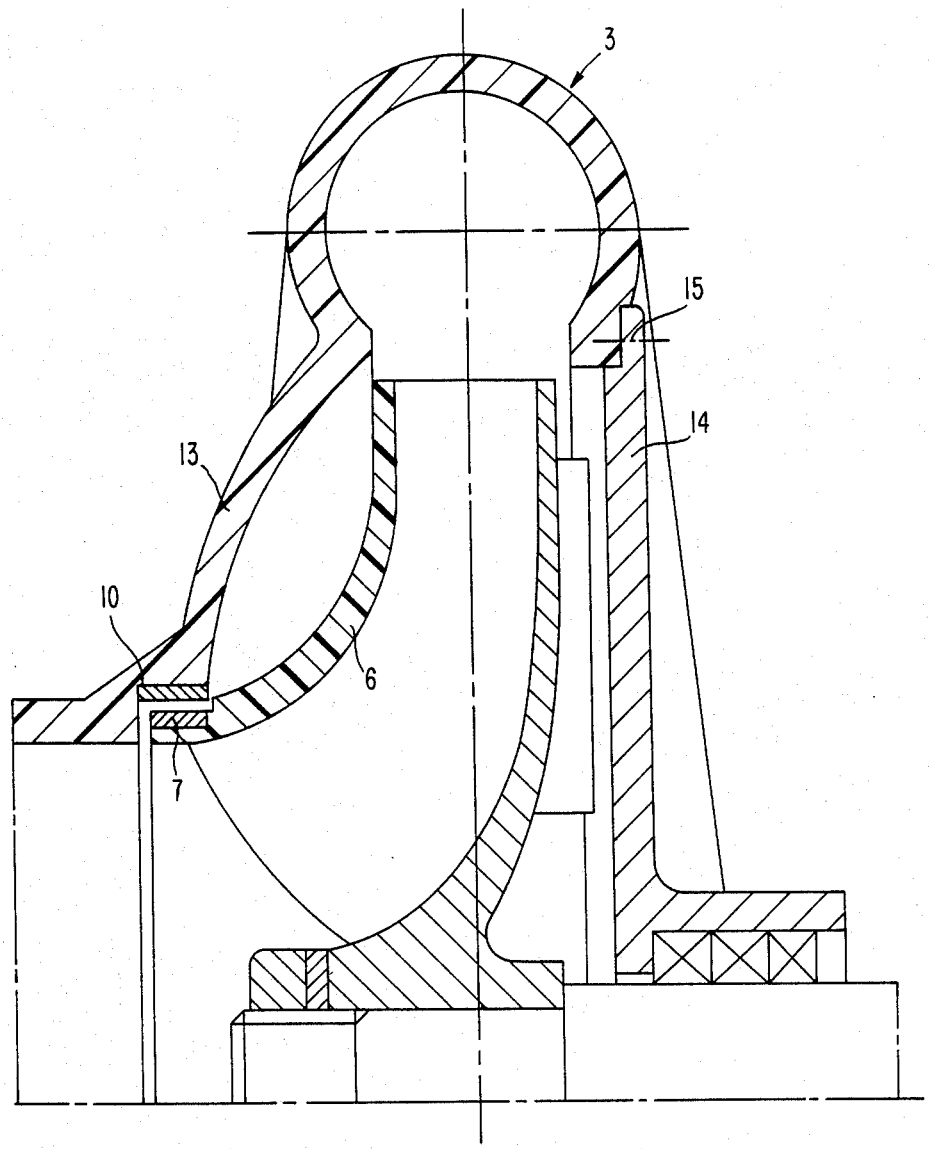
FIG. 2 shows an alternative embodiment of the split ring seal housing of this invention.

The centrifugal pump comprises a pump shaft 1 on which an impeller 2 is disposed for rotation therewith. The impeller 2 is surrounded by a pump housing 3 which is sealed with respect to the pump shaft 1 by an axial face seal or, alternatively, by a soft packing 4. At the suction side 5 of the centrifugal pump the impeller 2 is provided with a front cover disk 6 which has fastened thereto an inner ring 7 of a split ring seal 8 which additionally includes an outer ring 10 fastened to the adjacent portion 9 of the pump housing.

The two rings 7,10 of the split ring seal 8 consist of a sintered material based preferably on a metal silicide or of a metal carbide based on silicon carbide. Furthermore, the front cover disk 6 and at least the portion 9 of the pump housing 3 which is adjacent to the outer ring 10 of the split ring seal 8 consist of a cast polyamide which is made by the activated anionic polymerization of monomeric laurinlactam and which is respectively cast with the two rings 7,10. With regard to the inner ring 7, shrinking onto a hub which is coaxially formed on the cover disk 6 for this purpose may be an alternative to this type of integral casting, said shrinking being effected by undercooling the hub part of the wear disk. As for the outer ring 10, it can only be connected in a frictional manner to the adjacent portion 9 of the pump housing 3 by means of a screw or claw connection.

When the disk cover 6 is made from the aforementioned cast polyamide, it seems expedient to make the whole impeller 2 from said cast polyamide provided that this is possible with casting techniques. The same applies also to the whole pump housing 3; the aforementioned restriction to the portion 9 alone, which is directly adjacent to the outer ring 10 of the split ring seal 8, must here be understood such that this also includes an easy repair of centrifugal pumps in the case of which the whole pump housing consists of another material. When there is such a differently formed centrifugal pump, the repair of a differently formed damaged split ring seal can only necessitate the provision of a corresponding composite arrangement of the outer ring 10 consisting of a sintered material and of a housing portion adapted to the existing pump housing as a corresponding replacement part. In this case, however, the replacement should be expediently combined with a simultaneous replacement of the existing pump wheel by a replacement part in the case of which at least the cover disk 6 is also made from the cast polyamide and provided with the associated inner ring 7 of a split ring seal 8.

What is claimed is:

1. A split ring seal of a centrifugal pump which is formed by an inner ring disposed on the front cover disk of the impeller and by an outer ring disposed on the pump housing,
   characterized in that said two rings consist of a sintered material and that at least said cover disk and at least the portion of said pump housing which is adjacent to said outer ring consist of a cast polyamide which is made by the activated anionic polymerization of monomeric laurinlactam and to which the two rings are respectively connected in a frictional or positive manner.

2. The split ring seal set forth in claim 1,
   characterized in that said inner ring is shrunk onto a hub formed coaxially on said cover disk or integrally cast with said polyamide of said cover disk.

3. The split ring seal set forth in claim 1,
   characterized in that said outer ring is integrally cast with said polyamide of said adjacent portion of said pump housing.

4. The split ring seal set forth in any of claims 1 to 3,
   characterized in that both rings consist of a carbide metal based on a metal silicide or of a sintered ceramic material based on silicon carbide.

* * * * *